United States Patent
Bullough

(10) Patent No.: US 6,282,586 B1
(45) Date of Patent: Aug. 28, 2001

(54) METHOD IN AN OPERATING SYSTEM, A METHOD AND SYSTEM FOR SUPPORTING MULTIPLE HARDWARE DEVICES FROM A SINGLE COMMUNICATIONS PORT

(75) Inventor: Jeffrey Charles Bullough, South Jordan, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/183,508

(22) Filed: Oct. 28, 1998

(51) Int. Cl.[7] .................................................. G06F 13/14
(52) U.S. Cl. .................. 710/18; 710/2; 710/37; 710/137; 710/101; 709/310
(58) Field of Search .................. 710/18, 2, 37, 710/101, 137; 709/310

(56) References Cited

U.S. PATENT DOCUMENTS

| | | | |
|---|---|---|---|
| 4,794,520 | * 12/1988 | Kobus, Jr. et al. | 710/107 |
| 5,265,252 | * 11/1993 | Rawson, III et al. | 709/301 |
| 5,805,636 | * 9/1998 | Rao et al. | 375/222 |
| 5,807,175 | * 9/1998 | Davis et al. | 463/36 |
| 5,815,682 | * 9/1998 | Williams et al. | 395/500.46 |
| 5,901,325 | * 5/1999 | Cox | 712/1 |
| 5,991,830 | * 11/1999 | Beard et al. | 710/18 |
| 6,073,183 | * 6/2000 | Slonim | 709/310 |

* cited by examiner

*Primary Examiner*—Thomas Lee
*Assistant Examiner*—Abdelmoniem Elamin
(74) *Attorney, Agent, or Firm*—Workman, Nydegger & Seeley

(57) ABSTRACT

In an operating system for facilitating the execution of a communication application typically comprised of a single port interface, a method for facilitating the interaction of the single port interface of the communication application with a plurality of hardware devices through the selection of corresponding and compatible port drivers is presented. A device driver router is designated as the port driver for the specific communication application. The port driver router functions as an intermediate device driver for evaluating conditions that exist among the possible target hardware devices. The device driver router initiates the loading of the determined port driver and hooks the responding port handle from the device driver. The device driver router modifies the port information structure of the device driver to enable the device driver router to perform the closing and unloading of the port driver. The port driver router substitutes its information structure with that of the determined port driver for use in communicating through the open port.

18 Claims, 6 Drawing Sheets

METHOD IN AN OPERATING SYSTEM, A METHOD AND SYSTEM FOR SUPPORTING MULTIPLE HARDWARE DEVICES FROM A SINGLE COMMUNICATIONS PORT

BACKGROUND OF THE INVENTION

1. The Field of the Invention

The present invention relates generally to interfacing communication applications with hardware devices in a computer operating system. More specifically, the present invention relates to interfacing a standard single port communication application to multiple ports without requiring modification to the single port communication application.

2. The Relevant Technology

Typical computer software applications that interface with external hardware devices such as modems, printers, wireless transceivers, as well as other imaginable devices heretofore have been explicitly programmed to interface via a single interface port from the communication application to the target hardware device via an operating system. Many such communication applications have proliferated and have become uniquely successful in their target markets. To appreciate the advances of the present invention, it is necessary to understand how port devices are supported under modern commonplace operating systems. In the present description, an exemplary operating system, such as the Microsoft® Windows '95® and Windows '98® operating systems are discussed. These exemplary operating systems, among others, provide support for communications hardware through the architecture described in FIG. 1. In FIG. 1, the dotted line depicted as boundary 106 represents a protection interface provided by the operating system in conjunction with the microprocessor of the computing platform. Those familiar with the art of structured programming appreciate that applications and higher level drivers operate in the ring 3 area 114, while the operating system and lower level device drivers execute in ring 0 area 116. A communication application 100 provides control of a hardware device 112 through an application programming interface (API) which, in the exemplary operating system, consists of a 16 or a 32-bit application function call through the Wirlbox Win32 APIs of the Microsoft operating system. Functions performed through the API include configuring the device, reading data from the device or writing data to the device. Such API function calls 118 are handled by a software component, COMM.DRV 104 which, in FIG. 1, is depicted as a ring 3 device driver.

COMM.DRV device driver 104 passes the application function calls through the ring 3/ring 0 boundary 106 interface to another software module resident within the operating system known as VCOMM 108 using a VCOMM API 120. VCOMM 108 is a ring 0 device driver that manages all port drivers registered in the operating system. Among other things, VCOMM 108 manages the loading and unloading of port drivers, determines which port driver should handle function calls received through VCOMM API 120 and passes function calls to the appropriate driver for completion of the procedure.

A port driver 110 thereafter handles the details of completing function calls received from VCOMM 108 for a specific hardware device. In the present exemplary operating system (e.g., Windows '95 and Windows '98) such operating systems include port drivers for devices that communicate through serial ports (e.g., SERIAL.VXD) and parallel ports (e.g., LPT.VXD). For hardware devices 112 that deviate from such hardware interfaces, a compatible port driver must be developed and registered with the operating system for interfacing between VCOMM 108 and hardware 112.

While most communication applications have heretofore communicated directly with a single identified hardware device via a specific compatible port driver, technological advances have enabled communication data to be delivered to and propagated over various hardware configurations that may, for among various reasons, present a preferable hardware medium. For example, traditional computer-to-computer communications have taken place via hardware devices known as modems. A data-generating communication application originates data which is passed down through a device driver and ultimately a modem-compatible port driver for propagation across a physical medium such as a telephone line to a symmetrical receiving computer architecture. While the telephone line conduit provides a preferred interconnection in one case, other interconnection techniques may also provide a favorable channel in other applications. For example, in contrast to a modem operating as the hardware device for communicating over the telephone line, a wireless transceiver having internal modulation capabilities may also be employed for a wireless hardware device application. In such a configuration, a separate port driver compatible with the interactive interface of the wireless transceiver must be substituted for the modem-compatible port driver forming the above-described communication channel.

For such a wireless transceiver configuration, the communication application must be customized to interface with a wireless port driver. Such a menu of hardware devices requires that established communication applications be rewritten at great expense to accommodate each additionally discovered hardware device.

It would represent an advancement in the art to provide a method and system for interfacing a software communication application having a single port interface with a plurality of hardware devices without requiring the modification of the port interface of the communication application. It would further represent an advancement in the art to provide a method and system for enabling a user of a communication application to interact with the communication application in a consistent manner while relying upon the sophistication of the operating system and its associated components and drivers to carry out the requested data exchange over at least one of a plurality of hardware devices without requiring any modifications to the communication application or additional attention by the communication application user.

SUMMARY AND OBJECTS OF THE INVENTION

The present invention relates to a method for alternatively employing one of a plurality of port drivers without requiring the redevelopment of a communication application which traditionally has a single port interface. According to the invention, the inventive architecture employs an intermediate device driver, herein known as a port driver router, which is designated and registered as the port driver for the communication application. When the communication application requests that a port be opened, the designated port driver, the port driver router responds accordingly. In the present invention, the port driver router interfaces with the present hardware structure to determine which one of a possible plurality of hardware devices should be employed in the present port session. The port driver router thereafter makes a determination of which port driver, herein known as the real port driver, should be employed to properly interact with the selected hardware device.

Once the port driver router has determined which port driver should be employed for communicating with the hardware, the port driver router issues a request to the operating system to redirect or hook particular device service requests for servicing the port driver router. The port driver, thereafter acting as or similar to the VCOMM service, requests that the real port driver open a port. The real port driver responding accordingly, returns a port handle pointing to a port information structure comprised of a plurality of pointers to functions including the port close function of the real port driver.

The port driver router then acting in a broker-like manner, modifies the port information structure of the real port driver to include a pointer to the port close function of the port driver router rather than the real port driver. Consistent with the open port process, the port driver router returns a port handle to the requesting VCOMM service. However, rather than returning a port handle to the port driver router's port information structure, the port driver router returns the port handle to the real port driver's modified port information structure now comprised of the port driver router's port close function. The port driver router thereafter relinquishes or unhooks the redirection of particular device service calls such that processing resumes in a traditional manner with VCOMM directly servicing VCOMM requests. The communication application thereafter has an open port and interfaces with associated hardware through its single port interface using the port information structures of the real port driver.

When the communication application desires to close the port, the communication application calls the port close function of the port information structure which has been replaced with the close port function of the port driver router. The port driver router thereafter carries out a port close function comprised of closing the real port driver since the port driver router retained the real port drivers pointer to the port close function. The port driver router additionally unloads the real port driver and returns to VCOMM completing the requested closing of the communication port.

The invention is an advancement in the art by eliminating the need to rewrite communication applications or include within communication applications a myriad of port interfaces consistent with additional and continuously discovered and implemented hardware interface devices. In the present invention, rather then rewriting a rather large and complex communication application to interface with additional devices, an intermediate driver such as a port driver router may be efficiently developed. The port driver router may evaluate which hardware device should be utilized, select the appropriate driver for interacting with the selected hardware device and configure a function structure compatible for use by the communication application, which additionally is capable of managing the opening and closing of particular port drivers in a manner transparent to the communication application.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

In accordance with the present invention, an improved method for presenting a single port interface consistent with traditional single port interfaces of a communication software application while actually facilitating the physical interfacing of a plurality of hardware devices with the communications application is presented. The present invention employs modifications that can be made, in the preferred Microsoft Windows '95/98 embodiment, to the VCOMM/port driver interface to provide more flexible support for hardware devices that contain multiple functions and that need more than one port driver to support these functions. Such an invention provides the ability to control multiple port drivers from a single communication port. In such an implementation, the communication application may employ a single communication port to control all hardware functions of the device or devices.

Figure 1:
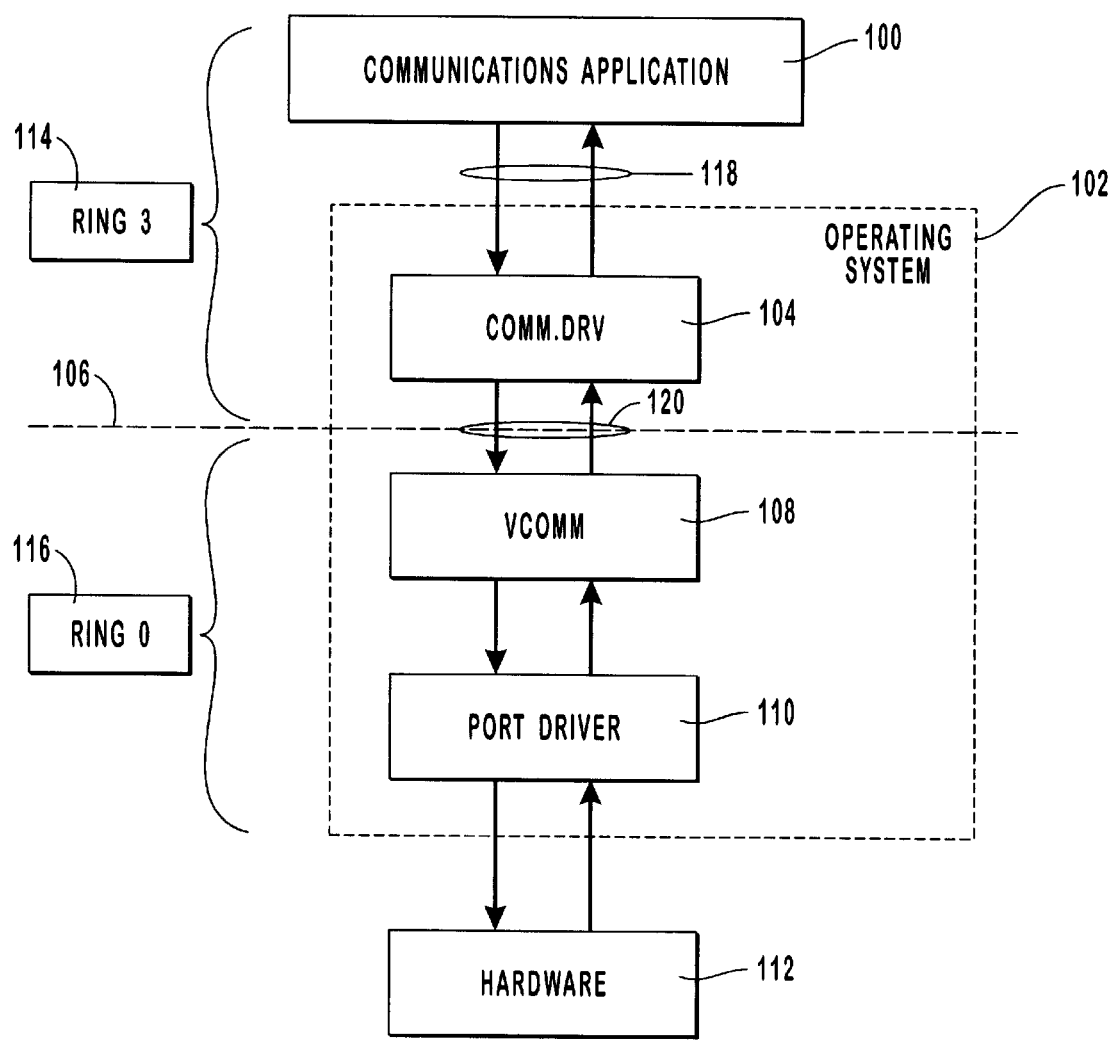
FIG. 1 is a simplified block diagram of the operating system driver architecture, in accordance with the prior art.
Figure 2:
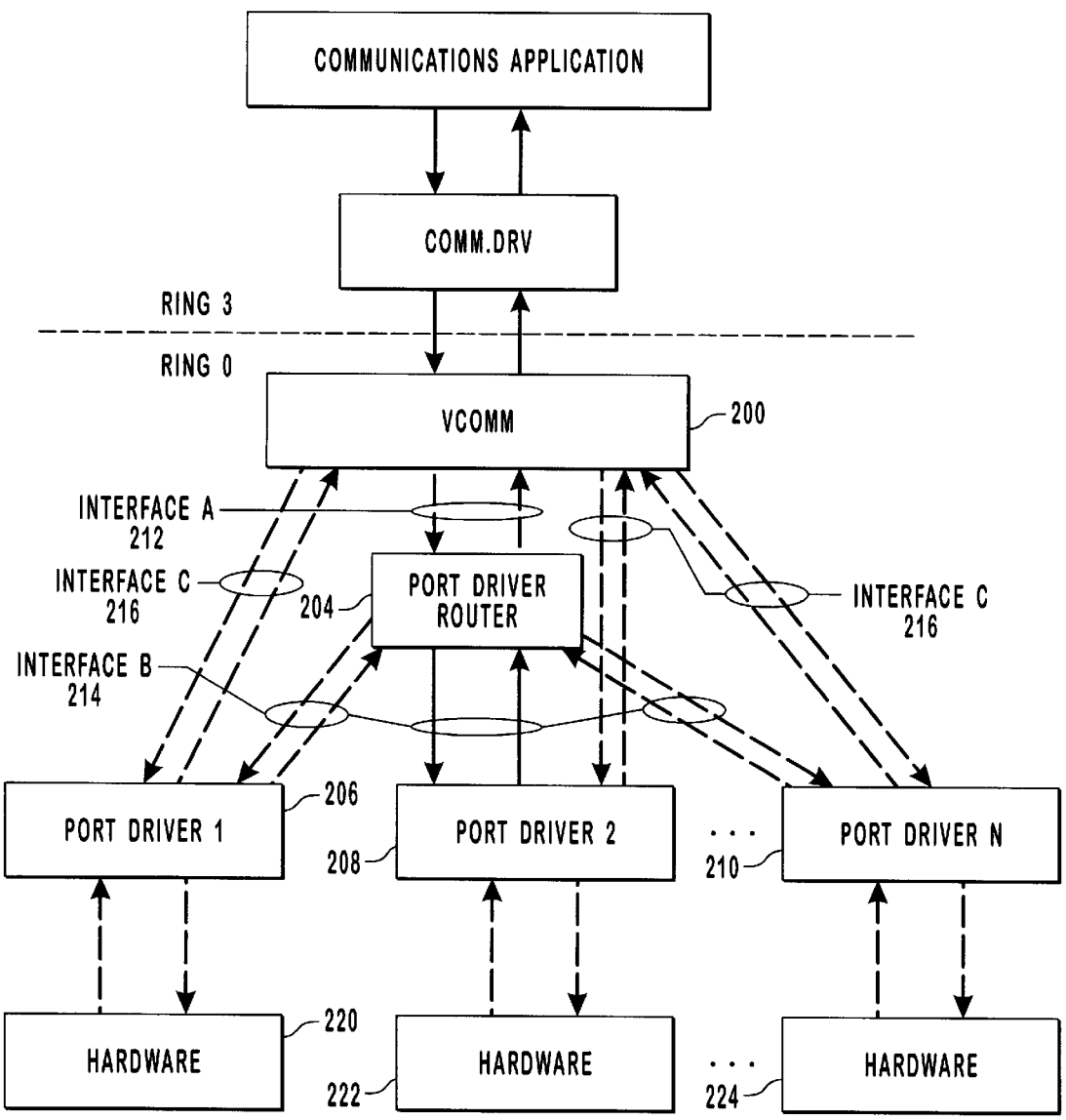
FIG. 2 is a simplified block diagram of the port driver router architecture, in accordance with the preferred embodiment of the present invention.
Figure 3A:
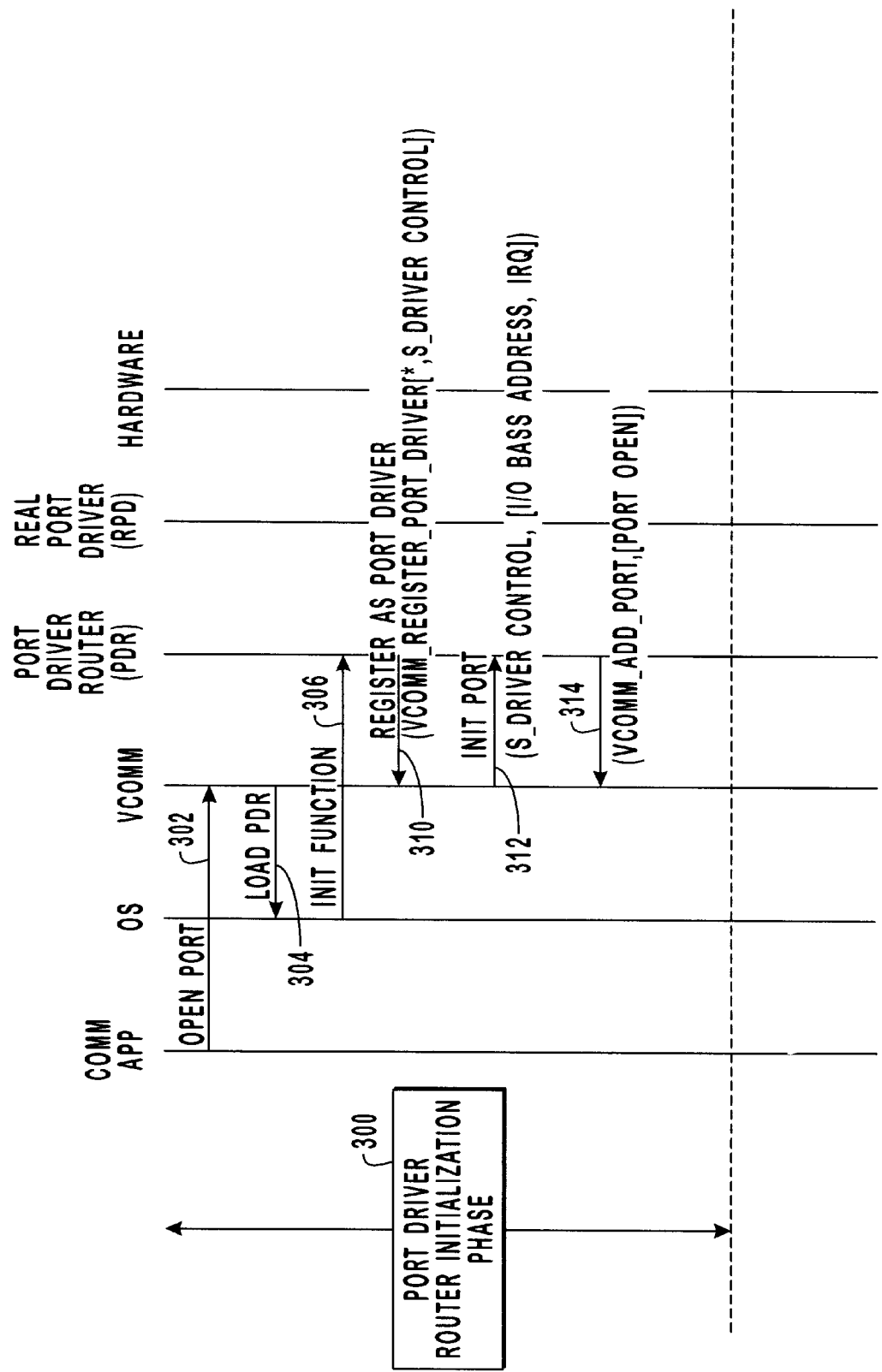
FIG. 3 is a simplified diagram explaining the inter-module message exchange for carrying out the selection and utilization of a port driver, in accordance with the preferred embodiment of the present invention.
Figure 3B:
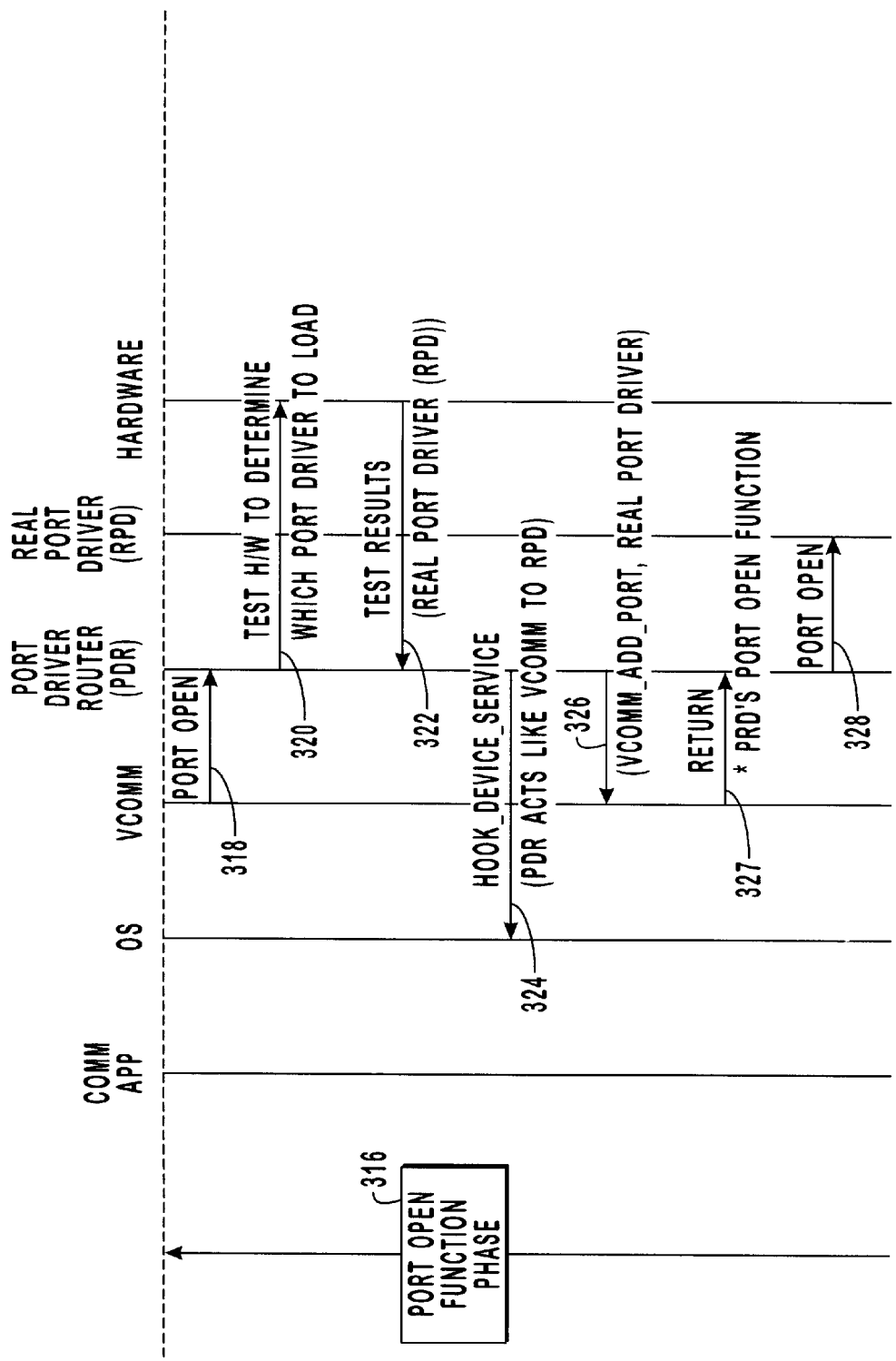
Figure 3C:
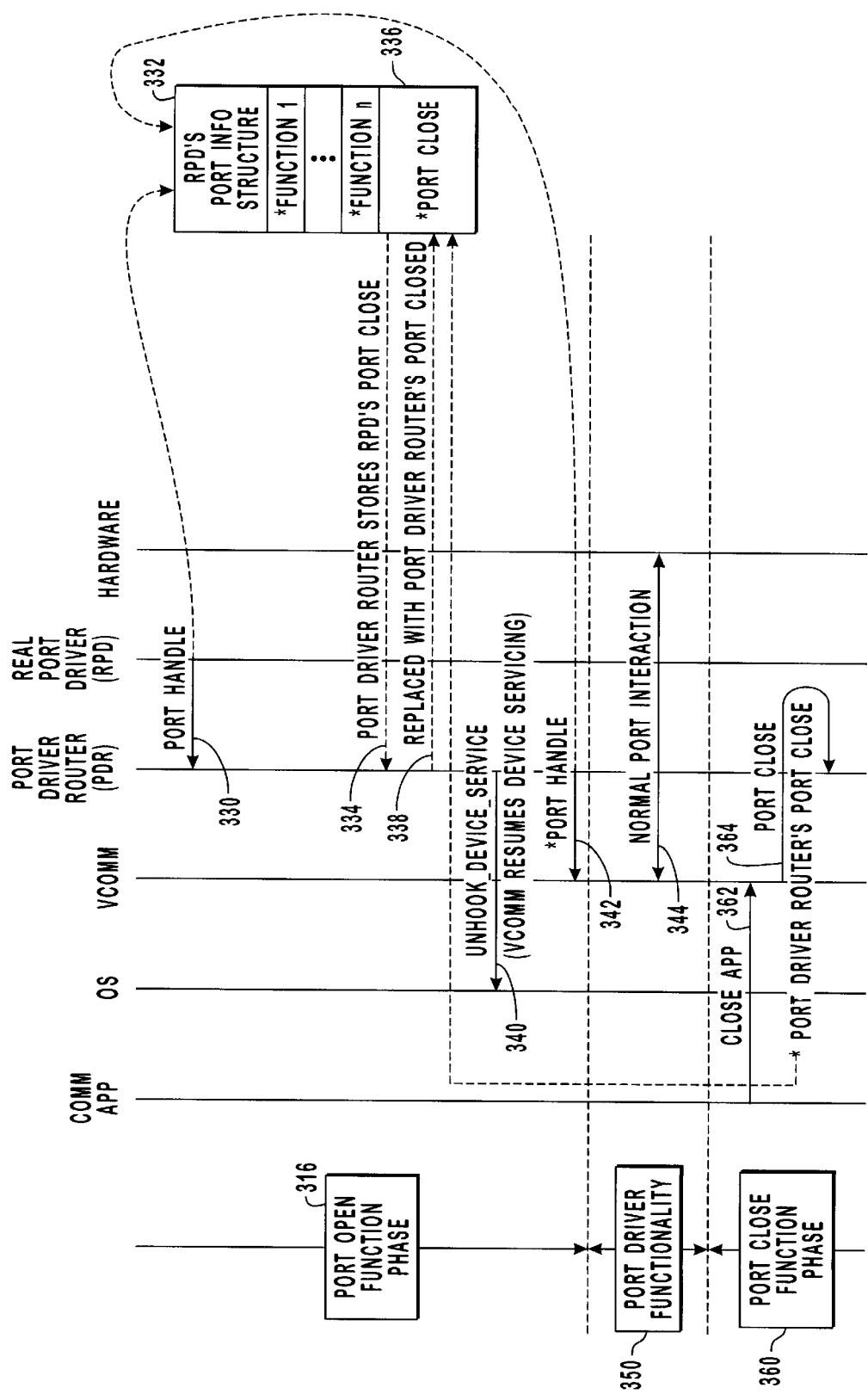
Figure 3D:
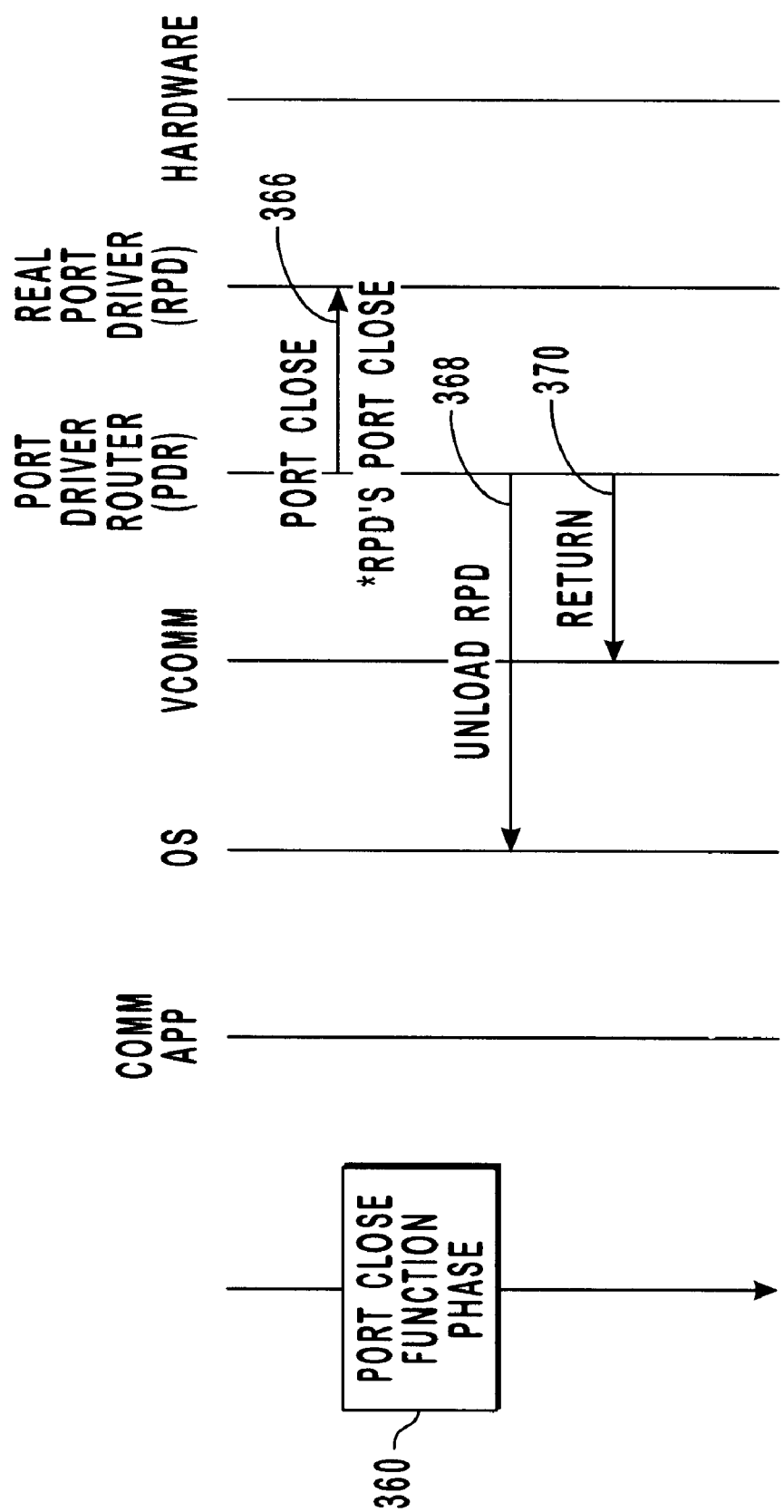

While the preferred embodiment of the present invention is depicted in terms and functionality consistent with the Microsoft Windows 95/98 architecture, it is also contemplated within the scope of the present invention that other operating systems employing similar driver architectures may also benefit from the present invention. In order to facilitate the explanation of the proposed invention, it is important to describe the operating system's interface between VCOMM and related port drivers. To facilitate such an explanation, the functionality and interface of the novel architecture is detailed into separate phases. FIGS. 2 and 3 depict the architectural relationships as well as the interaction between the modules of the present invention, respectfully. As such, discussion of the present invention will alternate between FIGS. 2 and 3.

In a port driver initialization phase 300, specific steps must be taken by a port driver during its driver initialization function to ensure that VCOMM 200 recognizes the port driver. When VCOMM 200 receives a call 302 to open a communication port, VCOMM 200 sends a request 304 to load the port driver if it is not already present. During the loading of the port driver, the operating system calls, in call 306, the port driver's initialization function. While executing this initialization function, the port driver must call a function named VCOMM_Register_Port_Driver 310 to register as a port driver with VCOMM. The parameter passed into this function is a pointer to the port drivers S_DriverControl function, which VCOMM calls before returning from VCOMM_Register_Port_Driver. VCOMM calls the S_DriverControl function in a call 312 to initialize the port and passes parameters identifying the resources (e.g., I/O base address and IRQ) to be used by the device. In the S_DriverControl function, the port driver calls another VCOMM function known as VCOMM_Add_Port 314 where it passes the address of its PortOpen function.

The next phase 316 employed by the present invention is associated with the port opening operation. After processing the VCOMM_Add_Port function, VCOMM calls the port driver's PortOpen function 318. Upon completion of the PortOpen function, the port driver returns a handle to the port. The port handle points to a port information structure that contains, among other things, a structure which holds pointers to all of the functions that the port driver may perform. It is through the pointers in this structure that VCOMM calls all available port driver functions.

The next phase 350 of the present architecture relates to the port driver functionality. After completing the previous steps, and successfully returning from the PortOpen call, VCOMM thereupon has all of the information necessary to use the port driver to communicate in a path 344 with the hardware for the application.

After the communication application has completed communication with the hardware device, the communication application in a port close phase 360 calls VCOMM to close the port. VCOMM handles this request by calling the port driver's PortClose function, whose pointer is contained within the function pointer structure in the port information structure. The purpose of the PortClose function is to terminate and cleanup any procedures the driver is performing and put the driver in a state to wait for further PortOpen calls. After returning from a PortClose call, if the port driver is dynamic, VCOMM unloads the port driver.

It should be pointed out that the present invention provides the ability to provide multiple hardware functions or devices through a single communication port without the operating system's knowledge of multiple devices. Such an implementation greatly simplifies the configuration and interaction of multi-function devices with the operating system. One example of a multi-function device is a modem that is capable of interfacing with both a public switched telephone network as well as a wireless communication transceiver such as a GSM device. Those skilled in the art can appreciate that there are other types of devices that may accommodate a plurality of alternative communication channels for exchanging data through the singular communication interface of a communication software application.

Referring to FIG. 2, the architecture of the present invention employs an intermediate device driver herein known as a port driver router 204 which is physically located between VCOMM 200 and port drivers 206, 208 and 210. Port driver router 204 provides or supports three separate interfaces in the present invention: an interface A 212, and interface B 214, and an interface C 216 located directly between VCOMM 200 and the respective port driver 206, 208 or 210.

Through interface A 212, port driver router 204 appears to VCOMM 200 as a single port driver that handles the steps described above, namely, port driver initialization and port open functions. Port driver router 204 calls the appropriate functions to register with VCOMM 200 and provides to VCOMM 200 the data that is necessary for interaction with port driver 206, 208 or 210. Port driver router 204 also responds to initialization functions called by the operating system and VCOMM 200. Port driver router 204 appears to VCOMM 200 and likewise interacts as a single port driver. Similarly, port driver router 204 appears as a VCOMM to each port driver 206, 208 and 210. That is to say, port driver router 204 loads port drivers as needed and mimics all initialization calls to the port drivers usually provided by VCOMM.

In the present invention, port driver router 204 registers with the operating system as the port driver for a communication application and a specific hardware device. When VCOMM 200 receives call 302 to open communications with the particular hardware device, VCOMM 200 performs the port driver initialization for port driver router 204 as described above. During initialization 306, port driver router 204 calls VCOMM_Register_Port_Driver 310 and VCOMM_Add_Port 314 as VCOMM 200 anticipates during the normal course of initialization. During such calls, the address of port driver router 204 pointing to its PortOpen function is passed to VCOMM 200. Such processing and exchange occurs through interface A 212 shown in FIG. 2. VCOMM 200 subsequently calls the PortOpen function 318 during which port driver router 204 determines which driver 206, 208 or 210 must be used to access the corresponding hardware 220, 222 or 224. Such a determination 320 and 322 may be performed either by querying the various hardware since their resources have already been received during the call to its S_Driver_Control function, or alternatively, by accessing values in the registry or other methods required by a specific implementation. After determining which driver to employ, port driver router 204 uses the Hook_Device_Service function 324 provided by the operating system to "hook" calls to VCOMM_Register_Port_Driver and VCOMM_Add_Port 326 which then loads the correct port driver.

During the port driver's initialization, port driver router 204 responds to both the port driver initialization phase and open port function phase steps through interface B 214 by handling the hooked VCOMM calls and storing the data passed to it by the port driver.

Port driver router 204 thereafter calls the real port driver's PortOpen function 328, which returns with the port handle 330 for the port driver. Port driver router 204 stores the real port driver's PortClose address 334 located in the port information structure 332 and thereafter replaces the PortClose address 338 with the address of its own PortClose function 336. All of the immediately foregoing interaction occurs through interface B 214 in FIG. 2. Port driver router 204 then unhooks the VCOMM functions using the operating system's Unhook_Device_Service 340 and returns from its PortOpen function with the port handle 342 of the real port driver.

All subsequent further interaction 344 in phase 350 between VCOMM and port driver 206, 208 or 210, during the port driver functionality phase, occurs directly through interface C 216, which is provided by the function pointers returned in the port information structure 332 of the real port driver. Such an implementation provides a very efficient interface that does not carry additional overhead that would be required for the passing of all functions through port driver router 204. That is to say, through the port driver functionality phase 350, port driver router 204 is no longer involved until VCOMM 200 initiates or calls the PortClose function.

In PortClose function phase 360, upon the initiation 362 of closing the port, VCOMM initiates a PortClose function 364. Port driver router 204 receives the call to the PortClose function 336 and thereafter port driver router 204 calls real port driver's function 366 as stored in step 334 and unloads in step 368 the corresponding real port driver prior to returning in step 370. Port router driver 204 then waits for a subsequent PortOpen call from VCOMM 200 to re-initiate the earlier described process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an operating system, a method for alternatively employing one of a plurality of port drivers from a software communication application having a single port interface, comprising the steps of:
   (a) opening a port from said communication application's single port interface to a port driver router, said port driver router being registered to said communication application as its registered port driver, said opening a port step comprising the steps of:
      (i) said port driver router determining one of a plurality of alternative hardware devices having a corresponding real port driver through which said single port interface of said communication application may communicate with said one of a plurality of alternative hardware devices, each of said plurality of possible hardware devices having a port driver associated therewith;
      (ii) said port driver router returning a port handle pointing to said real port driver's port function structure as modified to contain a pointer to said port driver router's close port function instead of a pointer to said real port driver's close port function;
   (b) during execution of said communication application, said single port interface interfacing with said real port driver and said corresponding one of said plurality of hardware devices via said real port driver's port function structure returned by said port driver router; and
   (c) closing said port to said real port driver when initiated by said communication application and as intercepted by said port driver router.

2. The method as recited in claim 1, wherein said opening a port from said communication application's single port interface to a port driver router step further comprises the step of:
   (a) registering said port driver router with said operating system as said communication application's port driver upon loading of said communication application.

3. The method as recited in claim 1, wherein said port driver router returning a port handle step comprises the steps of:
   (a) said port driver router loading said real port driver for use by said communication application's single port interface, said real port driver returning real port driver's port handle pointing to said real port driver's port function structure comprised of a plurality of function pointers including a pointer to said real port driver's close port function;
   (b) said port driver router exchanging in said real port driver's port function structure said pointer to said real port driver's close port function with a pointer to said port driver router's close port function; and
   (c) said port driver router returning said real port driver's port handle as said port driver router's handle to said operating system.

4. The method as recited in claim 3, wherein said loading step comprises the steps of:
   (a) hooking system calls to said operating system by said real port driver for redirection to said port driver router;
   (b) said port driver router opening said real port driver;
   (c) said operating system in response to said hooking and said opening said real port driver steps, sending said real port driver's port handle to said port driver router; and
   (d) unhooking said system calls from said redirection to said port driver router to return direction of said system calls to remain at said operating system.

5. The method as recited in claim 1, wherein said closing said port step comprises the steps of:
   (a) executing said port driver router's close port function as exchanged into said real port driver's port function structure;
   (b) said port driver router initiating execution of said real port driver's close port function; and
   (c) unloading said port driver router.

6. A computer operating system method for allowing communication applications having a single port interface capable of operating in a Windows 95/98 operating system to alternatively configure one of a plurality of port drivers to form a communication port, comprising the steps of:
   (a) opening said communications port from said communication application's single port interface to a port driver router, said port driver router being registered to said communication application as its registered port driver, said opening a port step comprising the steps of:
      (i) said port router driver determining through tests said one of a plurality of port drivers to employ in establishing said communications port;
      (ii) said port router driver returning a port handle pointing to said real port driver's port function structure as modified to contain a pointer to said port driver routers's close port function instead of a pointer to said real port driver's close port function; and
   (b) closing said communication port to said real port driver when initiated by said communication application and as intercepted by said port driver router.

7. The method as recited in claim 6, wherein said opening said communication port from said communication application's single port interface to a port driver router step, further comprises the step of:
   (a) registering said port driver router with said operating system as said communication application's port driver upon loading of said communication application, said registration being accommodated by VCOMM device driver in said operating system.

8. The method as recited in claim 6, wherein said opening step further comprises the step of:
   (a) receiving at said port driver router a port open command via VCOMM device driver in said operating system, said VCOMM device driver supporting an interface between said operating system and said drivers.

9. The method as recited in claim 8, wherein said opening step further comprises the steps of:
   (a) hooking system calls to said operating system by said real port driver for redirection to said port driver router;

(b) said port driver router opening said real port driver;

(c) said operating system in response to said hooking and said opening said real port driver steps, sending said real port driver's port handle to said port driver router; and (d) unhooking said system calls from said redirection to said port driver router to return direction of said system calls to remain at said operating system.

10. The method as recited in claim 9, wherein said closing said port step comprises the steps of:

(a) executing said port driver router's close port function as exchanged into said real port driver's port function structure;

(b) said port driver router initiating execution of said real port driver's close port function; and (c) unloading said port driver router.

11. A computer operating system method for allowing communication applications having a single port interface capable of operating in Windows 95/98 operating system and employing a VCOMM device driver for interfacing with ports, said method to alternatively configure one of a plurality of port drivers to form a communication port, comprising the steps of:

(a) receiving from said communication application a request for VCOMM to open said communication port with a port driver router, said port driver router being registered to said communication application as its registered port driver;

(b) VCOMM calling said port driver router's PortOpen function;

(c) said port driver router determining through tests said one of a plurality of port drivers to employ in establishing said communication port;

(d) said port driver router returning a port handle pointing to said real port driver's port function structure as modified to contain a pointer to said port driver router's close port function instead of a pointer to said real port driver's close port function; and (e) closing said communication port to said real port driver when initiated by said communication application and as intercepted by said port driver router.

12. The method as recited in claim 11, wherein said port driver router returning a port handle pointing to said real port driver's port function structure step further comprises the steps of:

(a) said port driver router calling a Hook_Device_Service function provided by said operating system to hook calls from said real port driver as normally serviced by VCOMM and redirect said real port driver calls to said port driver router;

(b) calling VXDLDR_LoadDevice to load said real port driver into said operating system;

(c) said port driver router calling a Port_Open function for said real port driver;

(d) receiving at said port driver router as redirected by said operating system as a result of said calling a Hook_Device_Service step said real port driver's port handle pointing to said real port driver's port function structure; and (e) said port driver router calling an Unhook_Device_Service function provided by said operating system to return direction of said system calls to remain at said operating system and said VCOMM.

13. The method as recited in claim 12, wherein said closing said port step comprises the steps of:

(a) VCOMM calling Port_Close function of said port driver router as exchanged into said real port driver's port function structure;

(b) said port driver router calling Port_Close function of said real port driver; and (c) said port driver router returning to said VCOMM.

14. A computer-readable medium having computer-executable instructions for performing a computer operating system method for allowing communication applications having a single port interface capable of operating in a Windows 95/98 operating system to alternatively configure one of a plurality of port drivers to form a communication port, said computer-executable instructions for performing steps comprising:

(a) opening said communications port from said communication application's single port interface to a port driver router, said port driver router being registered to said communication application as its registered port driver, said opening a port step comprising the steps of:

(i) said port driver router determining through tests said one of a plurality of port drivers to employ in establishing said communications port;

(ii) said port driver router returning a port handle pointing to said real port driver's port function structure as modified to contain a pointer to said port driver routers's close port function instead of a pointer to said real port driver's close port function; and (b) closing said communication port to said real port driver when initiated by said communication application and as intercepted by said port driver router.

15. The computer-readable medium having computer-executable instructions for performing the method as recited in claim 14, wherein said computer-executable instructions for performing the step of opening said communication port from said communication application's single port interface to a port driver router step, further comprises computer-executable instructions for performing the step of:

(a) registering said port driver router with said operating system as said communication application's port driver upon loading of said communication application, said registration being accommodated by VCOMM device driver in said operating system.

16. The computer-readable medium having computer-executable instructions for performing the method as recited in claim 14, wherein said computer-executable instructions for performing said opening step further comprises computer-executable instructions for performing the step of:

(a) receiving at said port driver router a port open command via VCOMM device driver in said operating system, said VCOMM device driver supporting an interface between said operating system and said drivers.

17. The computer-readable medium having computer-executable instructions for performing the method as recited in claim 16, wherein said computer-executable instructions for performing said opening step further comprises computer-executable instructions for performing the steps of:

(a) hooking system calls to said operating system by said real port driver for redirection to said port driver router;

(b) said port driver router opening said real port driver;

(c) said operating system in response to said hooking and said opening said real port driver steps, sending said real port driver's port handle to said port driver router; and (d) unhooking said system calls from said redirection to said port driver router to return direction of said system calls to remain at said operating system.

18. The computer-readable medium having computer-executable instructions for performing the method as recited in claim 17, wherein said computer-executable instructions for performing said closing said port step comprises computer-executable instructions for performing the steps of:

(a) executing said port driver router's close port function as exchanged into said real port driver's port function structure;

(b) said port driver router initiating execution of said real port driver's close port function; and (c) unloading said real port driver.

* * * * *

UNITED STATES PATENT AND TRADEMARK OFFICE
CERTIFICATE OF CORRECTION

PATENT NO. : 6,282,586 B1  Page 1 of 1
DATED : August 28, 2001
INVENTOR(S) : Jeffrey Charles Bullough It is certified that error appears in the above-identified patent and that said Letters Patent is hereby corrected as shown below:

Title page, Item [54] and Column 1, lines 1-4,
Title, delete "METHOD IN AN OPERATING SYSTEM, A METHOD AND SYSTEM FOR SUPPORTING MULTIPLE HARDWARE DEVICES FROM A SINGLE COMMUNICATIONS PORT" and insert -- METHOD IN AN OPERATING SYSTEM FOR INTERFACING A STANDARD SINGLE PORT COMMUNICATION APPLICATION TO MULTIPLE PORTS WITHOUT MODIFYING THE SINGLE PORT COMMUNICATION APPLICATION --

Title page,
Item [22], change "28" to -- 30 --

Column 9,
Line 54, change "VXDLDR_LoadDevice" to -- VCOMM_Add_Port --

Signed and Sealed this

Twenty-ninth Day of April, 2003

JAMES E. ROGAN
*Director of the United States Patent and Trademark Office*